US012601540B2

(12) United States Patent
Han et al.

(10) Patent No.: US 12,601,540 B2
(45) Date of Patent: Apr. 14, 2026

(54) DEVICE AND METHOD FOR RECOVERING CARBON DIOXIDE AND NITROGEN FROM FLUE GAS

(71) Applicant: HANGZHOU OXYGEN PLANT GROUP CO., LTD., Hangzhou City (CN)

(72) Inventors: Yisong Han, Hangzhou City (CN); Fang Tan, Hangzhou City (CN); Yunyun Jiang, Hangzhou City (CN); Lei Yao, Hangzhou City (CN); Yi Gao, Hangzhou City (CN); Xudong Peng, Hangzhou City (CN); Liangying Li, Hangzhou City (CN)

(73) Assignee: HANGZHOU OXYGEN PLANT GROUP CO., LTD., Hangzhou City (CN)

( * ) Notice: Subject to any disclaimer, the term of this patent is extended or adjusted under 35 U.S.C. 154(b) by 307 days.

(21) Appl. No.: 18/429,562

(22) Filed: Feb. 1, 2024

(65) Prior Publication Data

US 2024/0263873 A1 Aug. 8, 2024

(30) Foreign Application Priority Data

Feb. 8, 2023 (CN) .......................... 202310077474.5

(51) Int. Cl.
  *F25J 3/08* (2006.01)
  *B01D 53/26* (2006.01)
(52) U.S. Cl.
  CPC .............. *F25J 3/08* (2013.01); *B01D 53/265* (2013.01); *B01D 2257/80* (2013.01); *F25J 2200/04* (2013.01)

(58) Field of Classification Search
  CPC .. F25J 2200/02; F25J 2200/04; F25J 2200/50; F25J 2205/04; F25J 2205/40;
  (Continued)

(56) References Cited

U.S. PATENT DOCUMENTS 5,100,635 A 3/1992 Krishnamurthy et al.
6,035,662 A 3/2000 Howard et al.
(Continued)

FOREIGN PATENT DOCUMENTS

CA 2804273 A1 1/2012
CN 104513680 A 4/2015
(Continued)

*Primary Examiner* — Filip Zec
(74) *Attorney, Agent, or Firm* — PROI Intellectual Property US

(57) ABSTRACT

A device for recovering carbon dioxide and nitrogen from flue gas includes a pretreatment system, a $CO_2$ and $N_2$ separation system, a $N_2$ purification and liquefaction system, and a $CO_2$ purification and liquefaction system. The pretreatment system includes a high-temperature NG cooler, a gas-liquid separator, a booster fan, and a dryer; the $CO_2$ and $N_2$ separation system includes a low-temperature LNG cooler and a cryogenic adsorption device; the $N_2$ purification and liquefaction system includes a set of $N_2$ distillation and liquefaction device consisting of a compressor, a cooler, a heat exchanger, a gas-liquid separator, and a distillation tower; and the $CO_2$ purification and liquefaction system includes a set of $CO_2$ distillation and liquefaction device consisting of a compressor, a cooler, a condenser, an evaporator, a liquefier, and a purification tower, which are used for further purifying and liquefying desorbed gas obtained from the $CO_2$ and $N_2$ separation system.

7 Claims, 4 Drawing Sheets

(58) Field of Classification Search
 CPC .. F25J 2205/60; F25J 2210/62; F25J 2210/70;
  F25J 2215/04; F25J 2215/42; F25J
  2220/44; F25J 2220/80; F25J 2220/82;
  F25J 2230/08; F25J 2230/30; F25J
  2235/42; F25J 2245/42; F25J 2270/08;
  F25J 2270/42; F25J 2270/904; F25J
  3/0257; F25J 3/0266; F25J 3/08
 See application file for complete search history.

(56)         References Cited

U.S. PATENT DOCUMENTS

| | | | | |
|---|---|---|---|---|
| 10,480,853 | B2 * | 11/2019 | Lautenschlager | .... F25J 3/04175 |
| 10,663,222 | B2 * | 5/2020 | Kromer | F25J 3/0423 |
| 10,663,223 | B2 * | 5/2020 | Handley | F25J 3/04727 |
| 10,746,461 | B2 * | 8/2020 | Allam | F25J 3/04018 |
| 11,060,791 | B2 * | 7/2021 | Pierre, Jr. | F25J 1/0042 |
| 11,103,804 | B2 * | 8/2021 | Buttridge | B01D 3/143 |
| 11,353,261 | B2 * | 6/2022 | Higginbotham | F25J 3/08 |
| 11,512,897 | B2 * | 11/2022 | Herron | F25J 3/04672 |
| 11,933,541 | B2 * | 3/2024 | Xu | F25J 3/04412 |
| 12,055,345 | B2 * | 8/2024 | Prosser | F25J 3/04084 |
| 2019/0331418 | A1 | 10/2019 | Prosser et al. | |
| 2023/0050296 | A1 * | 2/2023 | Xu | F25J 3/04412 |
| 2024/0019206 | A1 * | 1/2024 | Peters | F25J 3/0242 |

FOREIGN PATENT DOCUMENTS

| | | | |
|---|---|---|---|
| CN | 107899376 | A | 4/2018 |
| CN | 109140903 | A | 1/2019 |
| CN | 210825439 | U | 6/2020 |
| CN | 216481836 | U | 5/2022 |
| CN | 216716763 | U | 6/2022 |
| CN | 114857856 | A | 8/2022 |
| CN | 115069057 | A | 9/2022 |
| EP | 0503910 | A1 | 9/1992 |
| JP | 2003056980 | A | 2/2003 |
| KR | 20090119463 | A | 11/2009 |
| WO | 2010103259 | A2 | 9/2010 |

* cited by examiner

DEVICE AND METHOD FOR RECOVERING CARBON DIOXIDE AND NITROGEN FROM FLUE GAS

TECHNICAL FIELD

The present invention relates to a device and method for recovering carbon dioxide and nitrogen from flue gas, belonging to the field of cryogenic technology.

BACKGROUND

Fossil fuel emissions account for 40% of total global carbon dioxide emissions, and China's energy structure situations of rich coal, oil shortage, and natural gas shortage make coal-fired flue gas become a main source of carbon dioxide emissions in China. Therefore, reducing carbon emissions from coal-fired flue gas is of great environmental significance. In processes of energy use, main technologies for separating and recovering $CO_2$ include: absorption technology, adsorption technology, membrane separation technology, cryogenic phase change separation technology, etc. Solution absorption is a most mature $CO_2$ capture method and has been widely applied in many flue gases around the world. $CO_2$ can be separated from atmospheric low-concentration flue gas, with a large treatment capacity and high purity of $CO_2$ obtained, but the regeneration of the absorbed solution requires a lot of heat. Meanwhile, absorbents are prepared from resources, lose efficacy after a period of use, and require continuous supply. Chemical absorbents also have some toxicity and corrosion, which have a significant impact on the environment, and the costs of their production and recovery are high. Membrane separation is to separate gases by means of difference in permeability of a thin film made of a polymer material against different gases, driven by pressure difference. This technology is limited in large-scale applications. Pressure swing adsorption technology has many advantages, such as easy regeneration of adsorbents, long service life of adsorbents, and simple equipment. However, for flue gas containing low-concentration carbon dioxide, the cost and energy consumption of room temperature pressure swing adsorption technology are high.

Meanwhile, China is a major importer of liquid natural gas (LNG). LNG is a cryogenic liquid mixture obtained by cryogenic liquefaction and purification of gaseous natural gas, with a temperature of −162° C. under normal pressure. A lot of cold energy will be released during re-gasification of LNG at a receiving station. In conventional re-gasification processes, the use of seawater to gasify LNG results in significant waste of cold energy and cold pollution to the surrounding sea or station environment. If a coal-fired power plant is built near an LNG receiving station, cold energy released during LNG gasification can drive the recovery of $CO_2$ and $N_2$ from flue gas, which can not only reduce investment of an LNG gasification device, but also can reduce electricity consumption of a recovery device and indirectly reduce greenhouse gas emissions to achieve significant economic and social benefits.

Chinese patent CN107899376A discloses a liquefaction capture and recovery device and method for carbon dioxide and nitrogen from flue gas, belonging to membrane separation and recovery, with high requirements of a membrane for cleanliness of a gas source, short service life, low product purity, and high membrane price, so the device and method are not suitable for industrial large-scale production.

Chinese patent CN210825439U discloses a system for synchronously recovering carbon dioxide and nitrogen from flue gas of a coal-fired power plant boiler, including a flue gas pretreatment system, a PSA1 system, a PSA2 system, a carbon dioxide compression and purification system, a carbon dioxide distillation and storage system, and a PSA high-purity nitrogen production system. The system can capture carbon dioxide and nitrogen to the maximum extent with high product purity, but has the problems of inflexible equipment operation and high energy consumption.

Chinese patent CN216481836U discloses a system for synchronously recovering nitrogen and carbon dioxide from boiler flue gas, including a flue gas pretreatment system, a carbon nitrogen separation system, a carbon dioxide secondary purification system, and a nitrogen concentration and purification system. The system can recover carbon dioxide and nitrogen to the maximum extent, but the carbon and nitrogen separation of the system adopts room temperature pressure swing adsorption technology, with adsorption pressure as high as 0.2-0.4 MPa and relatively high energy consumption. Moreover, cold energy is produced by conventional electric driven refrigeration, with high recovery cost.

SUMMARY

In response to the above technical background, the present invention aims to provide a device and method for recovering carbon dioxide and nitrogen from flue gas, which achieve recovery and utilization of $CO_2$ and $N_2$ from flue gas with low cost and low energy consumption using cold energy released by LNG gasification combined with cryogenic adsorption technology, and have high economic and social value. To achieve the above objective, the present invention adopts the following technology: A device for recovering carbon dioxide and nitrogen from flue gas includes a pretreatment system, a $CO_2$ and $N_2$ separation system, a $N_2$ purification and liquefaction system, and a $CO_2$ purification and liquefaction system, which are connected to each other by pipelines and valves; the pretreatment system includes a high-temperature NG cooler, a gas-liquid separator, a booster fan, and a dryer, which are used for removing water and cooling flue gas; the $CO_2$ and $N_2$ separation system includes a low-temperature LNG cooler and a cryogenic adsorption device, which are used for further cooling and adsorbing the pretreated flue gas to separate $CO_2$ and $N_2$; the $N_2$ purification and liquefaction system includes a set of $N_2$ distillation and liquefaction device consisting of a raw material compressor, a heat exchanger, a cooler, a gas-liquid separator, and a distillation system, which are used for further purifying and liquefying nitrogen-containing gas obtained from the $CO_2$ and $N_2$ separation system; and the $CO_2$ purification and liquefaction system includes a set of $CO_2$ distillation and liquefaction device consisting of a $CO_2$ compressor, a cooler, an evaporator, a condenser, a liquefier, and a purification tower, which are used for further purifying and liquefying desorbed gas obtained from the $CO_2$ and $N_2$ separation system.

As a preferred option: a first inlet of the high-temperature NG cooler of the pretreatment system is connected to a flue gas discharge port, flue gas is further cooled by high-temperature cooling capacity NG, the cooled flue gas passes through a first outlet of the high-temperature NG cooler, most of water in the flue gas is removed by the gas-liquid separator, and the water is discharged via a water outlet of the gas-liquid separator; the cooled flue gas passes through a gas outlet of the gas-liquid separator, is pressurized by the booster fan, and then enters the dryer via a channel for further drying; the dryer in the pretreatment system is connected to an inlet of the low-temperature LNG cooler, and the pretreated dry flue gas is reduced to about a boiling point temperature of $CO_2$ by LNG cold energy; an outlet of the low-temperature LNG cooler is connected to an inlet of the cryogenic adsorption device, $CO_2$ in the cryogenic flue gas is adsorbed and captured by the principle of cryogenic adsorption, crude carbon dioxide gas with high carbon purity is obtained in a desorbed gas outlet of the cryogenic adsorption device, and nitrogen-containing gas with high nitrogen purity and carbon dioxide content below 1 ppm is obtained in a discharged gas outlet of the cryogenic adsorption device, thereby achieving a purpose of carbon-nitrogen separation; and an adsorbent used in the cryogenic adsorption device is mainly molecular sieve or activated carbon.

As a preferred option: a discharged gas pipeline at an outlet of the cryogenic adsorption device is connected to an inlet of the raw material compressor of the $N_2$ purification and liquefaction system to pressurize the nitrogen-containing gas; an outlet of the raw material compressor is connected to a first inlet of the cooler, a first outlet of the cooler is connected to a first inlet of the heat exchanger, a second inlet of the cooler is connected to a high-temperature cooling capacity NG inlet pipeline, and a second outlet of the cooler is connected to an NG discharge pipeline; a first outlet of the heat exchanger is connected to the distillation system, a nitrogen outlet of the distillation system is connected to a second inlet of the heat exchanger, a second outlet of the heat exchanger is connected to an inlet of a circulating compressor, an outlet of the circulating compressor is connected to a third inlet of the heat exchanger, a third outlet of the heat exchanger is connected to a first inlet of the gas-liquid separator, and a liquid nitrogen product is obtained at a bottom of the gas-liquid separator and flows out via a first outlet of the gas-liquid separator; a second outlet of the gas-liquid separator is connected to a sixth inlet of the heat exchanger, and the sixth inlet is connected to the second outlet of the heat exchanger; an emptying gas outlet of the distillation system is connected to a fourth inlet of the heat exchanger, and a fourth outlet of the heat exchanger is connected to an emptying pipeline; and an LNG liquid inlet is connected to a fifth inlet of the heat exchanger, and a high-temperature cooling capacity NG outlet is connected to a fifth outlet of the heat exchanger. The nitrogen-containing gas obtained from the $CO_2$ and $N_2$ separation system is further purified and liquefied by the principle of cryogenic distillation to obtain a high-purity liquid nitrogen product, and the distillation system is a single-tower distillation or double-tower distillation system.

As a preferred option: a desorbed gas pipeline at the outlet of the cryogenic adsorption device is connected to an inlet of the $CO_2$ compressor of the $CO_2$ purification and liquefaction system to pressurize the crude carbon dioxide gas; an outlet of the $CO_2$ compressor is connected to a first inlet of the cooler, a first outlet of the cooler is connected to an inlet of the evaporator, a second inlet of the cooler is connected to the high-temperature cooling capacity NG inlet pipeline, and a second outlet of the cooler is connected to the NG discharge pipeline; an outlet of the evaporator is connected to a first inlet of the liquefier, a first outlet of the liquefier is connected to a middle inlet of the purification tower, a second inlet of the liquefier is connected to the high-temperature cooling capacity NG inlet pipeline, and a second outlet of the liquefier is connected to the NG discharge pipeline; a first inlet of the condenser is connected to the high-temperature cooling capacity NG inlet pipeline, and a first outlet of the condenser is connected to the NG outlet pipeline; and an industrial grade liquid carbon dioxide product is obtained at a bottom of the purification tower, and a first outlet at the bottom of the purification tower is connected to a storage system or a carbon dioxide refining system for secondary purification of $CO_2$ to obtain food grade carbon dioxide. A second outlet of the purification tower is connected to the exhaust gas emptying pipeline.

A method for recovering carbon dioxide and nitrogen from flue gas includes the following steps:

Step 1. Pretreatment of flue gas:

cooling and drying normal temperature and normal pressure flue gas.

Step 2. Separation of $CO_2$ and $N_2$ desorbing crude carbon dioxide gas and discharging nitrogen-containing gas from the gas dried by the dryer by the low-temperature LNG cooler and the cryogenic adsorption device.

Step 3. Purification and liquefaction to obtain $CO_2$ and $N_2$ products purifying and liquefying the crude carbon dioxide gas and the discharged nitrogen-containing gas by the $CO_2$ distillation and liquefaction device and the $N_2$ distillation and liquefaction device.

As a preferred option: a method for pretreatment of flue gas in step 1 is as follows: normal temperature and normal pressure flue gas enters the first inlet of the high-temperature NG cooler, the flue gas is cooled by high-temperature cooling capacity NG in the cooler, the cooled flue gas enters the gas-liquid separator via the first outlet of the high-temperature NG cooler, and most of water in the flue gas is discharged via the water outlet of the gas-liquid separator; and the cooled flue gas is discharged via the gas outlet of the gas-liquid separator and pressurized by the booster fan, and then enters the dryer via the channel for further drying until its dew point meets relevant requirements.

As a preferred option: a method for separation of $CO_2$ and $N_2$ in step 2 is as follows: the gas dried by the dryer enters the low-temperature LNG cooler via the inlet of the low-temperature LNG cooler, and the dry flue gas is reduced to about a boiling point temperature of $CO_2$ by LNG cold energy in the low-temperature LNG cooler; and the outlet of the low-temperature LNG cooler is connected to the inlet of the cryogenic adsorption device, $CO_2$ and the like in the cryogenic dry flue gas are adsorbed and captured by the principle of cryogenic adsorption, crude carbon dioxide gas with high carbon purity is obtained in the desorbed gas outlet of the cryogenic adsorption device, and nitrogen-containing gas with high nitrogen purity and carbon dioxide content below 1 ppm is obtained in the discharged gas outlet of the cryogenic adsorption device, thereby obtaining purified raw gas containing carbon dioxide and nitrogen and achieving the purpose of carbon-nitrogen separation.

As a preferred option: a method for purification and liquefaction of $N_2$ in step 3 is as follows: discharge gas from the discharged gas outlet of the cryogenic adsorption device is connected to the inlet of the raw material compressor via a pipeline to pressurize the nitrogen-containing gas; the outlet of the raw material compressor is connected to the first inlet of the cooler, the first outlet of the cooler is connected to the first inlet of the heat exchanger, the second inlet of the cooler is connected to the high-temperature cooling capacity NG inlet pipeline, and the second outlet of the cooler is connected to the NG discharge pipeline; the pressurized and cooled nitrogen-containing gas exchanges heat with external LNG, distilled circulating nitrogen, and distilled emptying gas in the heat exchanger, and is connected to the distillation system via the first outlet of the heat exchanger and separated and purified in the distillation system; the nitrogen outlet of the distillation system is connected to the second inlet of the heat exchanger, the nitrogen serves as circulating nitrogen and is connected to the inlet of the circulating compressor via the second outlet of the heat exchanger, the outlet of the circulating compressor is connected to the third inlet of the heat exchanger, the third outlet of the heat exchanger is connected to the gas-liquid separator, and a high-purity liquid nitrogen product is obtained at the bottom of the gas-liquid separator and flows out via the first outlet of the gas-liquid separator; the gas from the gas-liquid separator enters the sixth inlet of the heat exchanger via the second outlet of the gas-liquid separator, and enters the circulating compressor for compression via the second outlet after being reheated by the heat exchanger; the emptying gas from the distillation system is connected to the fourth inlet of the heat exchanger, and is discharged and emptied via the fourth outlet of the heat exchanger after being reheated; the LNG liquid inlet is connected to the fifth inlet of the heat exchanger, and the high-temperature cooling capacity NG flows out via the fifth outlet of the heat exchanger as a source of high-temperature cooling capacity for other systems;

A method for purification and liquefaction of $CO_2$ in step 3 is as follows: desorbed gas from the cryogenic adsorption device is connected to the inlet of the $CO_2$ compressor via the desorbed gas outlet to pressurize the crude carbon dioxide gas; the outlet of the $CO_2$ compressor is connected to the first inlet of the cooler, the second inlet of the cooler is connected to the high-temperature cooling capacity NG inlet pipeline, the second outlet of the cooler is connected to the NG discharge pipeline, and the compressed crude carbon dioxide gas is cooled by the high-temperature cooling capacity NG in the cooler; the first outlet of the cooler is connected to the inlet of the evaporator, and the cooled crude carbon dioxide gas serves as a heat source of the evaporator to provide heat for the gasification of liquid carbon dioxide; the outlet of the evaporator is connected to the first inlet of the liquefier, the second inlet of the liquefier is connected to the high-temperature cooling capacity NG inlet pipeline, the second outlet of the liquefier is connected to the NG discharge pipeline, and the crude carbon dioxide is liquefied and condensed by the high-temperature cooling capacity NG in the liquefier; the first outlet of the liquefier is connected to the middle inlet of the purification tower, and the crude carbon dioxide entering the purification tower undergoes heat and mass transfer purification in the purification tower; the first inlet of the condenser at the top of the tower is connected to the high-temperature cooling capacity NG inlet pipeline, the first outlet of the condenser is connected to the NG outlet pipeline, rising gas at the top of the tower is condensed and refluxed by the high-temperature cooling capacity NG, some waste gas is discharged and emptied via the second outlet of the purification tower, and industrial grade liquid carbon dioxide is obtained at the bottom of the purification tower and connected to the storage system via the first outlet at the bottom of the purification tower as an industrial grade liquid carbon dioxide product, or connected to the carbon dioxide refining system for secondary purification of $CO_2$ to obtain food grade carbon dioxide.

As a preferred option: the cold source for the cooler, the liquefier, the condenser, and the cooler in the $N_2$ purification and liquefaction system comes from the high-temperature cooling capacity NG generated during LNG vaporization, which is lower in energy consumption, safe and environment-friendly and can also achieve the recovery and utilization of the high-temperature cooling capacity LNG compared to conventional cold production by an electrically driven refrigeration mechanism. As a preferred option: the $N_2$ purification and liquefaction system uses the cold energy released during LNG gasification in the heat exchanger to drive the production of the liquid nitrogen product, instead of conventional cold production including compression and expansion with electrical energy, thereby greatly reducing energy consumption for the production of the high-purity liquid nitrogen product; meanwhile, the high-temperature cooling capacity NG generated during the gasification of LNG in the $N_2$ purification and liquefaction system to release energy can be used as a cold source for other components of the recovery system, thereby achieving gradient utilization of the cold energy of LNG at different temperatures.

The device and method for recovering carbon dioxide and nitrogen from flue gas, provided by the present invention, has the following beneficial effects:

1) The device and method use LNG as a cold source of the system, do not require any external electric refrigeration system, and therefore, save more energy. Meanwhile, according to the different temperature requirement of each system, cold energy of LNG at different temperatures is matched to achieve efficient utilization of cooling capacity of LNG.

2) The device and method separate carbon and nitrogen by cryogenic adsorption, and can obtain high-content crude carbon dioxide gas and nitrogen-containing gas respectively under low pressure, so the boosting power utilization of the subsequent purification system is higher, and the overall energy consumption is low.

3) The present invention utilizes LNG cold energy to liquefy and recover $CO_2$ and $N_2$ from flue gas, utilizes cryogenic adsorption separation characteristics to efficiently separate $CO_2$ and $N_2$, and uses cryogenic distillation to purify liquefied $CO_2$ and $N_2$, thereby obtaining high-purity liquid carbon dioxide and high-purity liquid nitrogen with low energy consumption and low cost.

DETAILED DESCRIPTION OF THE EMBODIMENTS

In order to make the technical problems to be solved, technical solutions, and beneficial effects of the present invention clearer, the present invention will be further described in detail below with in conjunction with FIGS. 1-4 and specific implementations. It should be noted that those of ordinary skilled in the art may further make improvements and modifications to the present invention without departing from the principle of the present invention, and these improvements and modifications fall within the protection scope of the claims of the present invention.

Figure 1:
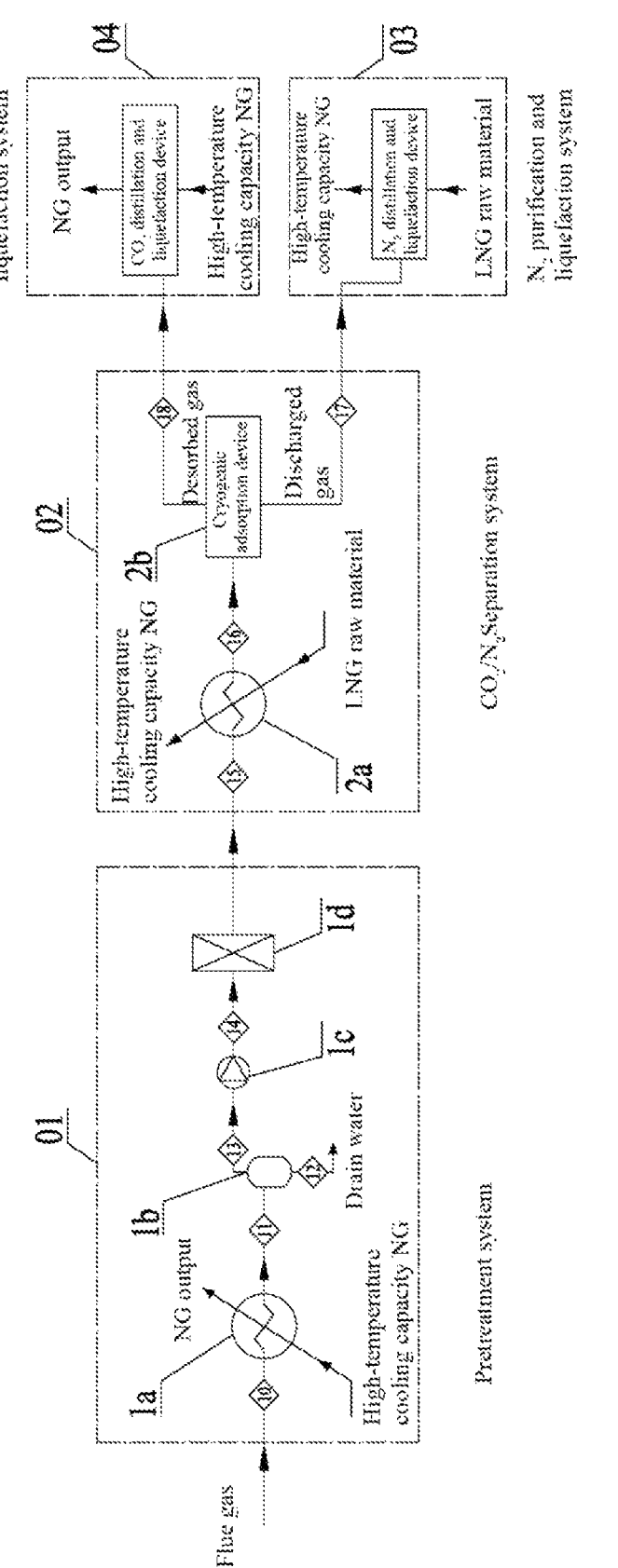
FIG. 1 is a flowchart of the present invention.

As shown in FIG. 1, a device for recovering carbon dioxide and nitrogen from flue gas includes a pretreatment system 01, a $CO_2$ and $N_2$ separation system 02, a $N_2$ purification and liquefaction system 03, and a $CO_2$ purification and liquefaction system 04, which are connected to each other by pipelines and valves. The pretreatment system 01 includes a high-temperature NG cooler 1a, a gas-liquid separator 1b, a booster fan 1c, and a dryer 1d, which are used for removing water and cooling flue gas; the $CO_2$ and $N_2$ separation system 02 includes a low-temperature LNG cooler 2a and a cryogenic adsorption device 2b, which are used for further cooling and adsorbing the pretreated flue gas to separate $CO_2$ and $N_2$; the $N_2$ purification and liquefaction system 03 includes a set of $N_2$ distillation and liquefaction device consisting of compressors 3a and 3k, a cooler 3b, a heat exchanger 3c, a gas-liquid separator 3i, and a distillation system 3m, which are used for further purifying and liquefying nitrogen-containing gas obtained from the $CO_2$ and $N_2$ separation system; and the $CO_2$ purification and liquefaction system 04 includes a set of $CO_2$ distillation and liquefaction device consisting of a $CO_2$ compressor 4a, a cooler 4b, an evaporator 4c, a condenser 4f, a liquefier 4d, and a purification tower 4e, which are used for further purifying and liquefying desorbed gas obtained from the $CO_2$ and $N_2$ separation system.

The pretreatment system 01 includes a high-temperature NG cooler 1a, a gas-liquid separator 1b, a booster fan 1c, and a dryer 1d. A first inlet 10 of the high-temperature NG cooler 1a is connected to a flue gas discharge port, flue gas is further cooled by high-temperature cooling capacity NG, the cooled flue gas passes through a first outlet 11 of the high-temperature NG cooler 1a, most of water in the flue gas is removed by the gas-liquid separator 1b, and the water is discharged via a water outlet 12 of the gas-liquid separator 1b; and the cooled flue gas passes through a gas outlet 13 of the gas-liquid separator 1b, is pressurized by the booster fan 1c, and then enters the dryer 1d via a channel 14 for further drying until its dew point meets relevant requirements.

The $CO_2$ and $N_2$ separation system includes a low-temperature LNG cooler 2a and a cryogenic adsorption device 2b, an inlet 15 of the low-temperature LNG cooler 2a is connected to an outlet of the dryer 1d in the pretreatment system 01, and the pretreated dry flue gas is reduced to around a boiling point temperature of $CO_2$ by LNG cold energy; and an outlet 16 of the low-temperature LNG cooler 2a is connected to an inlet of the cryogenic adsorption device 2b, $CO_2$ in the cryogenic flue gas is adsorbed and captured by the principle of cryogenic adsorption, crude carbon dioxide gas with high carbon purity is obtained in a desorbed gas outlet 18 of the cryogenic adsorption device, and nitrogen-containing gas with high nitrogen purity and carbon dioxide content below 1 ppm is obtained in a discharged gas outlet 17 of the cryogenic adsorption device, thereby achieving a purpose of carbon-nitrogen separation.

Figure 2:
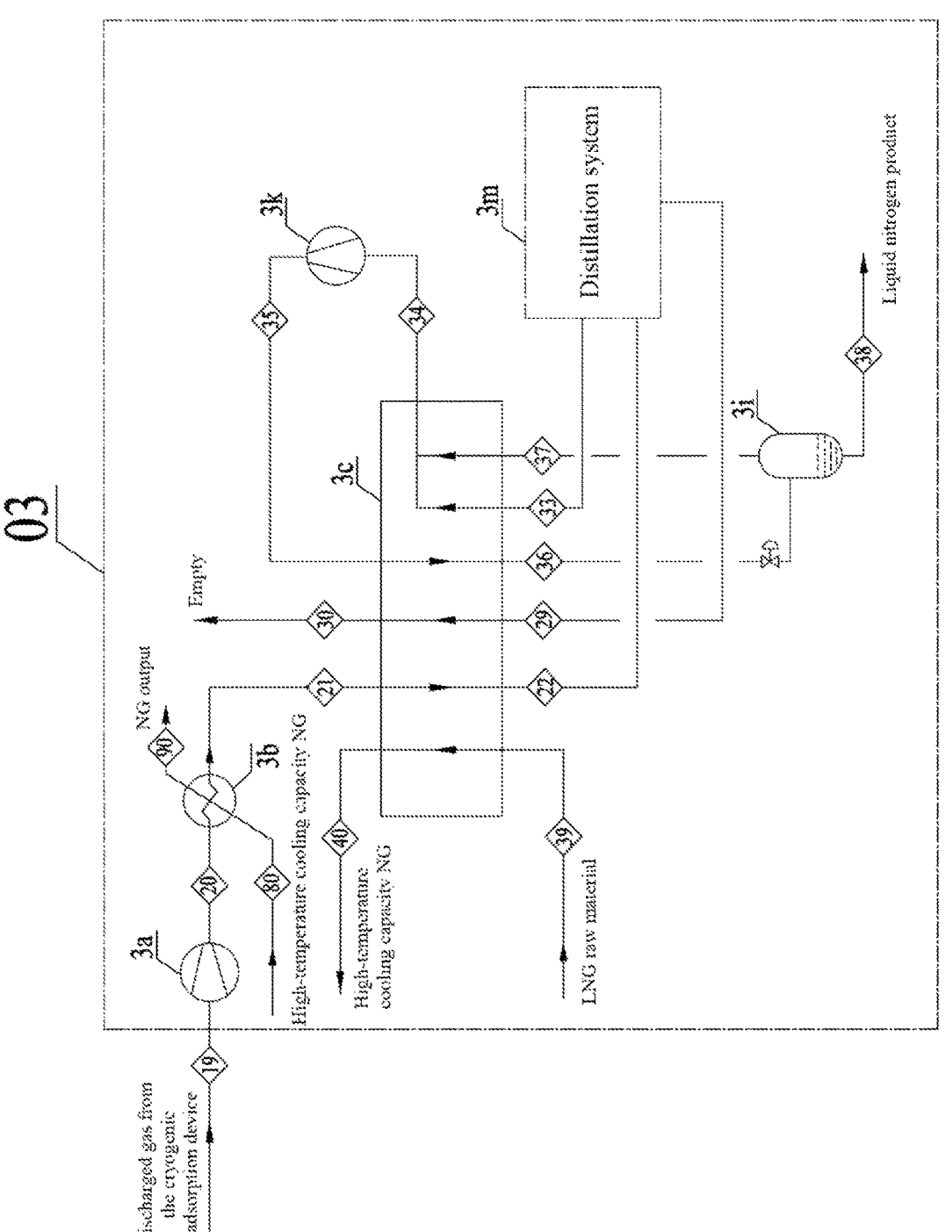
FIG. 2 is a schematic diagram of a $N_2$ purification and liquefaction structure in the present invention.

As shown in FIG. 2: an inlet 19 of the raw material compressor 3a of the $N_2$ purification and liquefaction system 03 is connected to the discharged gas outlet 17 of the cryogenic adsorption device 2b to pressurize the nitrogen-containing gas; an outlet of the raw material compressor 3a is connected to a first inlet 20 of the cooler 3b, a first outlet of the cooler 3b is connected to a first inlet 21 of the heat exchanger 3c, a second inlet 80 of the cooler 3b is connected to a high-temperature cooling capacity NG inlet pipeline, and a second outlet 90 of the cooler 3b is connected to an NG discharge pipeline; a first outlet 22 of the heat exchanger 3c is connected to the distillation system 3m, a nitrogen outlet of the distillation system 3m is connected to a second inlet 33 of the heat exchanger 3c, a second outlet 34 of the heat exchanger 3c is connected to an inlet of a circulating compressor 3k, an outlet of the circulating compressor 3k is connected to a third inlet 35 of the heat exchanger 3c, a third outlet 36 of the heat exchanger is connected to a first inlet of the gas-liquid separator 3i, and a liquid nitrogen product is obtained at a bottom of the gas-liquid separator 3i and flows out via a first outlet 38 of the gas-liquid separator 3i; a second outlet of the gas-liquid separator 3i is connected to a sixth inlet 37 of the heat exchanger 3c, and the sixth inlet 37 is connected to the second outlet 34 of the heat exchanger 3c; an emptying gas outlet of the distillation system 3m is connected to a fourth inlet 29 of the heat exchanger, and a fourth outlet 30 of the heat exchanger is connected to an emptying pipeline; and an LNG liquid inlet is connected to a fifth inlet 39 of the heat exchanger, and a high-temperature cooling capacity NG outlet is connected to a fifth outlet 40 of the heat exchanger. The nitrogen-containing gas obtained from the $CO_2$ and $N_2$ separation system is further purified and liquefied by the principle of cryogenic distillation to obtain a high-purity liquid nitrogen product.

Figure 3:
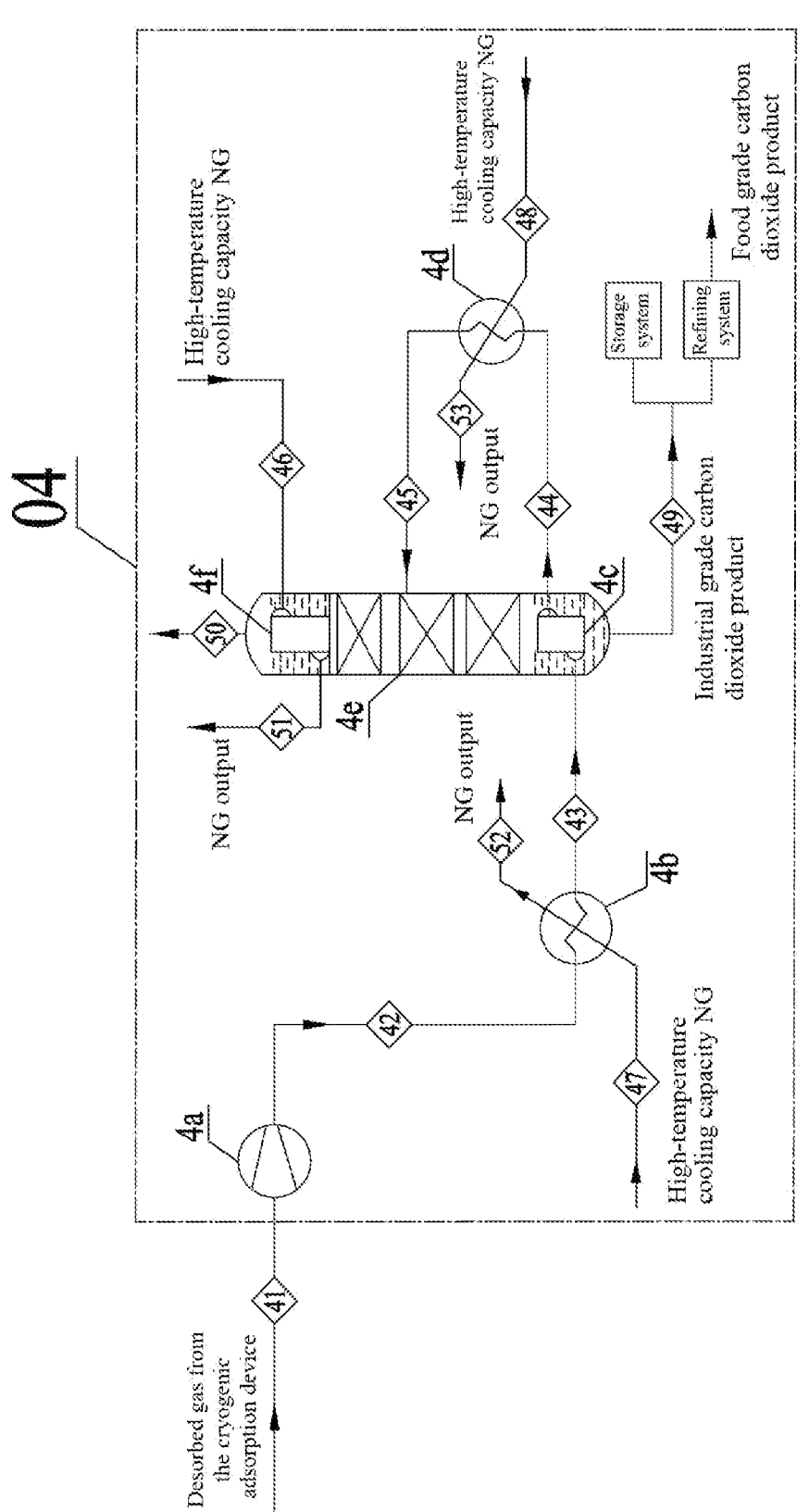
FIG. 3 is a schematic diagram of a $CO_2$ purification and liquefaction structure in the present invention.

As shown in FIG. 3, the $CO_2$ purification and liquefaction system 04 includes a set of $CO_2$ distillation and liquefaction device consisting of a $CO_2$ compressor 4a, a cooler 4b, an evaporator 4c, a liquefier 4d, a condenser 4f, and a purification tower 4e. An inlet 41 of the $CO_2$ compressor 4a is connected to the desorbed gas outlet 18 of the cryogenic adsorption device 2b to pressurize the crude carbon dioxide gas; an outlet of the $CO_2$ compressor 4a is connected to a first inlet 42 of the cooler 4b, a first outlet 43 of the cooler 4b is connected to an inlet of the evaporator 4c, a second inlet 47 of the cooler 4b is connected to the high-temperature cooling capacity NG inlet pipeline, and a second outlet 52 of the cooler 4b is connected to the NG discharge pipeline; an outlet of the evaporator 4c is connected to a first inlet 44 of the liquefier 4d, a first outlet 45 of the liquefier 4d is connected to a middle inlet of the purification tower 4e, a second inlet 48 of the liquefier 4d is connected to the high-temperature cooling capacity NG inlet pipeline, and a second outlet 53 of the liquefier 4d is connected to the NG discharge pipeline; a first inlet 46 of the condenser 4f is connected to the high-temperature cooling capacity NG inlet pipeline, and a first outlet 51 of the condenser 4f is connected to the NG outlet pipeline; and an industrial grade liquid carbon dioxide product is obtained at a bottom of the purification tower 4e, and a first outlet 49 at the bottom of the purification tower 4e is connected to a storage system or a carbon dioxide refining system for secondary purification of $CO_2$ to obtain food-grade carbon dioxide. A second outlet 50 of the purification tower 4e is connected to the exhaust gas emptying pipeline.

A specific implementation includes the following steps:

Step 1: Normal temperature and normal pressure flue gas enters the first inlet 10 of the high-temperature NG cooler 1a, the flue gas is cooled by high-temperature cooling capacity NG in the cooler 1a, the cooled flue gas enters the gas-liquid separator 1b via the first outlet 11 of the high-temperature NG cooler 1a, and most of water in the flue gas is discharged via the water outlet 12 of the gas-liquid separator; and the cooled flue gas is discharged via the gas outlet 13 of the gas-liquid separator 1b and pressurized by the booster fan 1c, and then enters the dryer 1d via the channel 14 for further drying until its dew point meets relevant requirements.

Step 2: The gas dried by the dryer 1d enters the low-temperature LNG cooler 2a via the inlet 15 of the low-temperature LNG cooler 2a, and the dry flue gas is reduced to about a boiling point temperature of $CO_2$ by LNG cold energy in the low-temperature LNG cooler 2a; and the outlet 16 of the low-temperature LNG cooler 2a is connected to the inlet of the cryogenic adsorption device 2b, $CO_2$ and the like in the cryogenic dry flue gas are adsorbed and captured by the principle of cryogenic adsorption, crude carbon dioxide gas with high carbon purity is obtained in the desorbed gas outlet 18 of the cryogenic adsorption device 2b, and nitrogen-containing gas with high nitrogen purity and carbon dioxide content below 1 ppm is obtained in the discharged gas outlet 17 of the cryogenic adsorption device 2b, thereby obtaining purified raw gas containing carbon dioxide and nitrogen and achieving the purpose of carbon-nitrogen separation.

Step 3: Discharged gas from the discharged gas outlet 17 of the cryogenic adsorption device 2b is connected to the inlet 19 of the raw material compressor 3a via a pipeline to pressurize the nitrogen-containing gas; the outlet of the raw material compressor 3a is connected to the first inlet 20 of the cooler 3b, the first outlet of the cooler 3b is connected to the first inlet 21 of the heat exchanger 3c, the second inlet 80 of the cooler 3b is connected to the high-temperature cooling capacity NG inlet pipeline, and the second outlet 90 of the cooler 3b is connected to the NG discharge pipeline; the pressurized and cooled nitrogen-containing gas exchanges heat with external LNG, distilled circulating nitrogen, and distilled emptying gas in the heat exchanger 3c, and is connected to the distillation system 3m via the first outlet 22 of the heat exchanger 3c and separated and purified in the distillation system 3m; the nitrogen outlet of the distillation system 3m is connected to the second inlet 33 of the heat exchanger 3c, the nitrogen serves as circulating nitrogen and is connected to the inlet of the circulating compressor 3k via the second outlet 34 of the heat exchanger 3c, the outlet of the circulating compressor 3k is connected to the third inlet 35 of the heat exchanger 3c, the third outlet 36 of the heat exchanger 3c is connected to the gas-liquid separator 3i, and a high-purity liquid nitrogen product is obtained at the bottom of the gas-liquid separator 3i and flows out via the first outlet 38 of the gas-liquid separator 3i; the gas from the gas-liquid separator 3i enters the sixth inlet 37 of the heat exchanger 3c via the second outlet of the gas-liquid separator 3i, and enters the circulating compressor 3k for compression via the second outlet 34 after being reheated by the heat exchanger; the emptying gas from the distillation system 3m is connected to the fourth inlet 29 of the heat exchanger 3c, and is discharged and emptied via the fourth outlet 30 of the heat exchanger 3c after being reheated; the LNG liquid inlet is connected to the fifth inlet 39 of the heat exchanger 3c, and the high-temperature cooling capacity NG flows out via the fifth outlet 40 of the heat exchanger 3c as a source of high-temperature cooling capacity for other systems.

Step 4: Desorbed gas from the cryogenic adsorption device 2b is connected to the inlet 41 of the CO₂ compressor 4a via the desorbed gas outlet 18 to pressurize the crude carbon dioxide gas; the outlet of the CO₂ compressor 4a is connected to the first inlet 42 of the cooler 4b, the second inlet 47 of the cooler 4b is connected to the high-temperature cooling capacity NG inlet pipeline, the second outlet 52 of the cooler 4b is connected to the NG discharge pipeline, and the compressed crude carbon dioxide gas is cooled by the high-temperature cooling capacity NG in the cooler 4b; the first outlet 43 of the cooler 4b is connected to the inlet of the evaporator 4c, and the cooled crude carbon dioxide gas serves as a heat source of the evaporator to provide heat for the gasification of liquid carbon dioxide; the outlet of the evaporator 4c is connected to the first inlet 44 of the liquefier 4d, the second inlet 48 of the liquefier 4d is connected to the high-temperature cooling capacity NG inlet pipeline, the second outlet 53 of the liquefier 4d is connected to the NG discharge pipeline, and the crude carbon dioxide is liquefied and condensed by the high-temperature cooling capacity NG in the liquefier 4d; the first outlet 45 of the liquefier 4d is connected to the middle inlet of the purification tower 4e, and the crude carbon dioxide entering the purification tower undergoes heat and mass transfer purification in the purification tower; the first inlet 46 of the condenser 4f at the top of the tower is connected to the high-temperature cooling capacity NG inlet pipeline, the first outlet 51 of the condenser 4f is connected to the NG outlet pipeline, rising gas at the top of the tower is condensed and refluxed by the high-temperature cooling capacity NG, some waste gas is discharged and emptied via the second outlet 50 of the purification tower 4e, and industrial grade liquid carbon dioxide is obtained at the bottom of the purification tower 4e and connected to the storage system via the first outlet 49 at the bottom of the purification tower 4e as an industrial grade liquid carbon dioxide product, or connected to the carbon dioxide refining system for secondary purification of CO₂ to obtain food grade carbon dioxide.

An adsorbent used in the cryogenic adsorption device 2b is mainly molecular sieve or activated carbon.

The distillation system 3m in the N₂ purification and liquefaction system 03 may adopt either a single-tower distillation process or a double-tower distillation process.

The device and method use cold energy released during LNG vaporization as a source of system cooling capacity, do not require any external electric refrigeration system, and therefore, save more energy. Meanwhile, according to the different temperature requirement of each system, cold energy of LNG at different temperatures is matched to achieve efficient utilization of different gradient cooling capacities of LNG.

The device and method separate carbon and nitrogen by cryogenic adsorption, and can obtain high-content crude carbon dioxide gas and nitrogen-containing gas respectively under low pressure, with overall low energy consumption.

Figure 4:
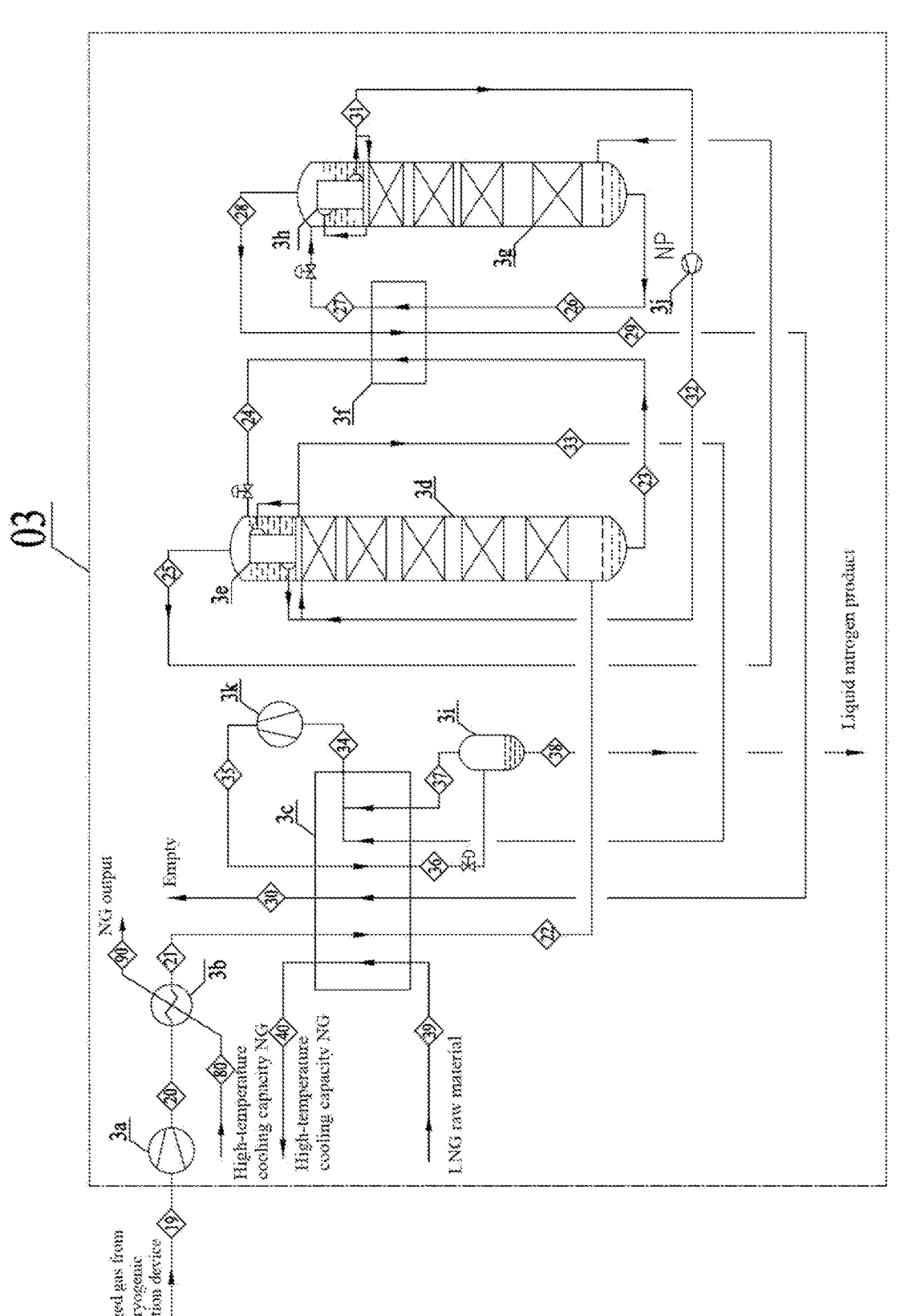
FIG. 4 is a schematic diagram of another $N_2$ purification and liquefaction structure in the present invention.

FIG. 4 is a schematic diagram showing a variant example of the N₂ purification and liquefaction system 03 in the device and method. The distillation system 3m of the N₂ purification and liquefaction system 03 mainly includes a first pressure tower 3d, a first condensing evaporator 3e, a subcooler 3f, a second pressure tower 3g, a second condensing evaporator 3h, and a liquid nitrogen pump 3j.

Specific implementation steps are as follows:

The first outlet 22 of the heat exchanger 3c is connected to a bottom inlet of the first pressure tower 3d, liquid from a bottom outlet of the first pressure tower 3d is connected to a first inlet 23 of the subcooler 3f, a first outlet 24 of the subcooler 3f is connected to an inlet of the first condensing evaporator 3e, the liquid from a bottom of the first pressure tower 3d is subcooled by the cooler 3f and then enters the first condensing evaporator 3e as a cold source, an outlet 25 of the first condensing evaporator 3e is connected to a bottom inlet of the second pressure tower 3g, and nitrogen from a top outlet of the first pressure tower 3d is connected to the second inlet 33 of the heat exchanger; a bottom outlet of the second pressure tower 3g is connected to a second inlet 26 of the subcooler 3f, a second outlet 27 of the subcooler 3f is connected to an inlet of the second condensing evaporator 3h, liquid from a bottom of the second pressure tower 3g is subcooled by the subcooler 3f and then enters the second condensing evaporator 3h as a cold source, an outlet of the second condensing evaporator 3h is connected to a third inlet 28 of the subcooler 3f, and a third outlet of the subcooler 3f is connected to the fourth inlet 29 of the heat exchanger; and liquid nitrogen extracted from a top 3*l* of the second pressure tower 3*g* is pressurized by the liquid nitrogen pump 3*j* and returns to a top 32 of the first pressure tower 3*d*.

SPECIFIC EMBODIMENTS

Embodiment 1

As shown in FIGS. 1, 2, and 3: 1. Normal temperature and normal pressure boiler flue gas 10 of about 50° C. and 0.1 MPaA that meets national ultra-low emission standards enters the inlet of the high-temperature NG cooler 1*a* via a pipeline, the flue gas is further cooled to about 5° C. by high-temperature cooling capacity NG in the cooler, the cooled flue gas enters the first inlet 11 of the gas-liquid separator 1*b*, and most of water in the flue gas is discharged via the water outlet 12 of the gas-liquid separator; and the cooled flue gas is discharged via the gas outlet 13 of the gas-liquid separator and pressurized by the booster fan 1*c*, and then the flue gas of about 0.12 MPaA enters the dryer 1*d* via the channel 14 for further drying until its dew point meets relevant requirements.

2. Dry gas from the outlet of the dryer 1*d* is connected to the inlet 15 of the low-temperature LNG cooler 2*a*, and the dry flue gas is reduced to about a boiling point temperature −78° C., 0.11 MPaA of $CO_2$ by LNG cold energy in the cooler; and the outlet 16 of the low-temperature LNG cooler 2*a* is connected to the inlet of the cryogenic adsorption device 2*b*, $CO_2$ and the like in the cryogenic dry flue gas are adsorbed and captured by the principle of cryogenic adsorption, crude carbon dioxide gas with high carbon purity is obtained in the desorbed gas outlet 18 of the cryogenic adsorption device 2*b*, and nitrogen-containing gas with high nitrogen purity and carbon dioxide content below 1 ppm is obtained in the discharged gas outlet 17 of the cryogenic adsorption device 2*b*, thereby obtaining purified raw gas containing carbon dioxide and nitrogen and achieving the purpose of carbon-nitrogen separation.

3. Discharged gas of about −70° C. and 0.1 MPaA from the discharged gas outlet 17 of the cryogenic adsorption device 2*b* is connected to the inlet 19 of the raw material compressor 3*a* via a pipeline to pressurize the nitrogen-containing gas to about 0.75 MPaA; the outlet of the raw material compressor 3*a* is connected to the first inlet 20 of the cooler 3*b*, the pressurized nitrogen-containing gas of about 5° C. at the first outlet of the cooler 3*b* is connected to the first inlet 21 of the heat exchanger 3*c*, the second inlet 80 of the cooler 3*b* is connected to the high-temperature cooling capacity NG inlet pipeline, and the second outlet 90 of the cooler 3*b* is connected to the NG discharge pipeline; the pressurized nitrogen-containing gas exchanges heat with LNG, distilled circulating nitrogen, and distilled emptying gas in the heat exchanger 3*c*, and the nitrogen-containing gas of about −172° C. and 0.72 MPaA is connected to the distillation system 3*m* via the first outlet 22 of the heat exchanger 3*c* and separated and purified in the distillation system; nitrogen of about 0.71 MPaA at the outlet of the distillation system 3*m* is connected to the second inlet 33 of the heat exchanger 3*c*, the nitrogen serves as circulating nitrogen, the nitrogen of about −121° C. and 0.7 MPaA is connected to the inlet of the circulating compressor 3*k* via the second outlet 34 of the heat exchanger 3*c*, the nitrogen of about −50° C. and 6.0 MPaA at the outlet of the circulating compressor 3*k* is connected to the third inlet 35 of the heat exchanger 3*c*, the third outlet 36 of the heat exchanger 3*c* is connected to the gas-liquid separator 3*i*, a high-purity liquid nitrogen product is obtained at the bottom of the gas-liquid separator 3*i*, and the liquid nitrogen product of about −191° C. and 0.6 MPaA is discharged via the first outlet 38 of the gas-liquid separator 3*i*; the gas in the gas-liquid separator 3*i* is connected to the sixth inlet 37 of the heat exchanger 3*c* via the top second outlet, the sixth inlet 37 is connected to the second outlet 34 of the heat exchanger 3*c*, and the gas returns to the inlet of the circulating compressor; emptying gas of about −178° C. and 0.14 MPaA discharged by the distillation system 3*m* is connected to the fourth inlet 29 of the heat exchanger 3*c*, reheated to normal temperature, and then discharged and emptied via the fourth outlet 30 of the heat exchanger 3*c*; the gas of about −140° C. and 10.0 MPaA at the LNG liquid inlet is connected to the fifth inlet 39 of the heat exchanger 3*c*, and the high-temperature cooling capacity NG of about −70° C. and 9.7 MPaA flows out via the fifth outlet 40 of the heat exchanger 3*c* as a source of high-temperature cooling capacity for other systems.

4. The desorbed gas outlet 18 of the cryogenic adsorption device 2*b* is connected to the inlet 41 of the $CO_2$ compressor 4*a* to pressurize the crude carbon dioxide gas to about 2.4 MPaA; the outlet of the $CO_2$ compressor is connected to the first inlet 42 of the cooler 4*b*, the first outlet 43 of the cooler 4*b* is connected to the inlet of the evaporator 4*c*, the second inlet 47 of the cooler 4*b* is connected to the high-temperature cooling capacity NG inlet pipeline, the second outlet 52 of the cooler 4*b* is connected to the NG discharge pipeline, and the compressed crude carbon dioxide gas is cooled by the high-temperature NG in the cooler 4*b*; the cooled crude carbon dioxide gas of about 6° C. at the first outlet 43 of the cooler 4*b* is connected to the inlet of the evaporator 4*c* and serves as a heat source of the evaporator to provide heat for the gasification of liquid carbon dioxide; the liquid carbon dioxide of about 15° C. at the outlet of the evaporator 4*c* is connected to the first inlet 44 of the liquefier 4*d*, the first outlet 45 of the liquefier 4*d* is connected to the middle inlet of the purification tower 4*e*, the second inlet 48 of the liquefier 4*d* is connected to the high-temperature cooling capacity NG inlet pipeline, the second outlet 53 of the liquefier 4*d* is connected to the NG discharge pipeline, and the crude carbon dioxide is liquefied and condensed by the high-temperature cooling capacity NG in the liquefier 4*d*; the crude carbon dioxide entering the purification tower transfers heat and mass in the purification tower for further purification; the first inlet 46 of the condenser 4*f* at the top of the tower is connected to the high-temperature cooling capacity NG inlet pipeline, the first outlet 51 of the condenser 4*f* is connected to the NG outlet pipeline, rising gas at the top of the tower is condensed and refluxed by the high-temperature cooling capacity NG, some waste gas is discharged and emptied from the second outlet at the top of the purification tower 4*e*, an industrial grade liquid carbon dioxide product is obtained at the bottom of the purification tower 4*e*, and the product of about −17° C. and 2.3 MPaA at the first outlet 49 at the bottom of the purification tower 4*e* is connected to the storage system or connected to the carbon dioxide refining system for secondary purification of $CO_2$ to obtain food grade carbon dioxide.

Embodiment 2

As shown in FIG. 4: The gas of about −172° C. and 0.72 MPaA from the first outlet 22 of the heat exchanger 3*c* is connected to the bottom inlet of the first pressure tower 3*d*, and is separated and purified in the first pressure tower 3*d*; liquid from the bottom outlet of the first pressure tower 3*d* is connected to the first inlet 23 of the subcooler 3*f*, the liquid of about −175° C. and 0.72 MPaA at the first outlet 24 of the subcooler 3f is connected to the inlet of the first condensing evaporator 3e, the liquid from the bottom of the first pressure tower 3d is subcooled by the cooler 3f and then enters the first condensing evaporator 3e as a cold source, the cold source of about −180° C. and 0.4 MPaA at the outlet 25 of the first condensing evaporator 3e is connected to the bottom inlet of the second pressure tower 3g, and the evaporated cold source enters the second pressure tower 3g for secondary separation and purification; nitrogen of about 0.71 MPaA from the top outlet of the first pressure tower 3d is connected to the second inlet 33 of the heat exchanger; the bottom outlet of the second pressure tower 3g at about −180° C. and 0.4 MPaA is connected to the second inlet 26 of the subcooler 3f, the second outlet 27 of the subcooler 3f is connected to the inlet of the second condensing evaporator 3h, liquid from the bottom of the second pressure tower 3g is subcooled by the subcooler 3f and then enters the second condensing evaporator 3h as a cold source, the outlet of the second condensing evaporator 3h is connected to the third inlet 28 of the subcooler 3f, and the third outlet of the subcooler 3f is connected to the fourth inlet 29 of the heat exchanger at about −178° C. and 0.14 MPaA; and liquid nitrogen extracted from the top 3l of the second pressure tower 3g is pressurized by the liquid nitrogen pump 3j to about 1.0 MPaA and returns to the top 32 of the first pressure tower 3d.

The invention claimed is:

1. A device for recovering carbon dioxide and nitrogen from flue gas, the device comprises a pretreatment system, a $CO_2$ and $N_2$ separation system, a $N_2$ purification and liquefaction system, and a $CO_2$ purification and liquefaction system, which are connected to each other by pipelines and valves, wherein the pretreatment system comprises a high-temperature NG cooler, a gas-liquid separator, a booster fan, and a dryer, which are used for removing water and cooling flue gas; the $CO_2$ and $N_2$ separation system comprises a low-temperature LNG cooler and a cryogenic adsorption device, which are used for further cooling and adsorbing the pretreated flue gas to separate $CO_2$ and $N_2$; the $N_2$ purification and liquefaction system comprises a set of $N_2$ distillation and liquefaction device consisting of a raw material compressor, a heat exchanger, a cooler, a gas-liquid separator, and a distillation system, which are used for further purifying and liquefying nitrogen-containing gas obtained from the $CO_2$ and $N_2$ separation system; the $CO_2$ purification and liquefaction system comprises a set of $CO_2$ distillation and liquefaction device consisting of a $CO_2$ compressor, a cooler, an evaporator, a condenser, a liquefier, and a purification tower, which are used for further purifying and liquefying desorbed gas obtained from the $CO_2$ and $N_2$ separation system;

a first inlet of the high-temperature NG cooler of the pretreatment system is connected to a flue gas discharge port, flue gas is further cooled by high-temperature cooling capacity NG, the cooled flue gas passes through a first outlet of the high-temperature NG cooler, most of water in the flue gas is removed by the gas-liquid separator, and the water is discharged via a water outlet of the gas-liquid separator; the cooled flue gas passes through a gas outlet of the gas-liquid separator, is pressurized by the booster fan, and then enters the dryer via a channel for further drying; the dryer in the pretreatment system is connected to an inlet of the low-temperature LNG cooler, and the pretreated dry flue gas is reduced to about a boiling point temperature of $CO_2$ by LNG cold energy; an outlet of the low-temperature LNG cooler is connected to an inlet of the cryogenic adsorption device, $CO_2$ in the cryogenic flue gas is adsorbed and captured by the principle of cryogenic adsorption, crude carbon dioxide gas with high carbon purity is obtained in a desorbed gas outlet of the cryogenic adsorption device, and nitrogen-containing gas with high nitrogen purity and carbon dioxide content below 1 ppm is obtained in a discharged gas outlet of the cryogenic adsorption device, thereby achieving a purpose of carbon-nitrogen separation; an adsorbent used in the cryogenic adsorption device is mainly molecular sieve or activated carbon;

the discharged gas outlet of the cryogenic adsorption device is connected to an inlet of the raw material compressor of the $N_2$ purification and liquefaction system to pressurize the nitrogen-containing gas; an outlet of the raw material compressor is connected to a first inlet of the cooler, a first outlet of the cooler is connected to a first inlet of the heat exchanger, a second inlet of the cooler is connected to a high-temperature cooling capacity NG inlet pipeline, and a second outlet of the cooler is connected to an NG discharge pipeline; a first outlet of the heat exchanger is connected to the distillation system, a nitrogen outlet of the distillation system is connected to a second inlet of the heat exchanger, a second outlet of the heat exchanger is connected to an inlet of a circulating compressor, an outlet of the circulating compressor is connected to a third inlet of the heat exchanger, a third outlet of the heat exchanger is connected to a first inlet of the gas-liquid separator, and a liquid nitrogen product is obtained at a bottom of the gas-liquid separator and flows out via a first outlet of the gas-liquid separator; a second outlet of the gas-liquid separator is connected to a sixth inlet of the heat exchanger, and the sixth inlet is connected to the second outlet of the heat exchanger; an emptying gas outlet of the distillation system is connected to a fourth inlet of the heat exchanger, and a fourth outlet of the heat exchanger is connected to an emptying pipeline; an LNG liquid inlet is connected to a fifth inlet of the heat exchanger, and a high-temperature cooling capacity NG outlet is connected to a fifth outlet of the heat exchanger; the nitrogen-containing gas obtained from the $CO_2$ and $N_2$ separation system is further purified and liquefied by the principle of cryogenic distillation to obtain a high-purity liquid nitrogen product, and the distillation system is a single-tower distillation or double-tower distillation system; and the desorbed gas outlet of the cryogenic adsorption device is connected to an inlet of the $CO_2$ compressor of the $CO_2$ purification and liquefaction system to pressurize the crude carbon dioxide gas; an outlet of the $CO_2$ compressor is connected to a first inlet of the cooler, a first outlet of the cooler is connected to an inlet of the evaporator, a second inlet of the cooler is connected to the high-temperature cooling capacity NG inlet pipeline, and a second outlet of the cooler is connected to the NG discharge pipeline; an outlet of the evaporator is connected to a first inlet of the liquefier, a first outlet of the liquefier is connected to a middle inlet of the purification tower, a second inlet of the liquefier is connected to the high-temperature cooling capacity NG inlet pipeline, and a second outlet of the liquefier is connected to the NG discharge pipeline; a first inlet of the condenser is connected to the high-temperature cooling capacity NG inlet pipeline, and a first outlet of the condenser is connected to the NG outlet pipeline;

and an industrial grade liquid carbon dioxide product is obtained at a bottom of the purification tower, and a first outlet at the bottom of the purification tower is connected to a storage system or a carbon dioxide refining system for secondary purification of $CO_2$ to obtain food grade carbon dioxide; and a second outlet of the purification tower is connected to the exhaust gas emptying pipeline.

2. A method for recovering carbon dioxide and nitrogen from flue gas using the device according to claim 1, wherein the method comprises the following steps:

step 1. pretreatment of flue gas:

cooling and drying normal temperature and normal pressure flue gas;

step 2. separation of $CO_2$ and $N_2$ desorbing crude carbon dioxide gas and discharging nitrogen-containing gas from the gas dried by the dryer by the low-temperature LNG cooler and the cryogenic adsorption device;

step 3. purification and liquefaction to obtain $CO_2$ and $N_2$ products purifying and liquefying the crude carbon dioxide gas and the discharged nitrogen-containing gas by the $CO_2$ distillation and liquefaction device and the $N_2$ distillation and liquefaction device.

3. The method according to claim 2, wherein a method for pretreatment of flue gas in step 1 is as follows: normal temperature and normal pressure flue gas enters the first inlet of the high-temperature NG cooler, the flue gas is cooled by high-temperature cooling capacity NG in the cooler, the cooled flue gas enters the gas-liquid separator via the first outlet of the high-temperature NG cooler, and most of water in the flue gas is discharged via the water outlet of the gas-liquid separator; and the cooled flue gas is discharged via the gas outlet of the gas-liquid separator and pressurized by the booster fan, and then enters the dryer via the channel for further drying until its dew point meets relevant requirements.

4. The method according to claim 2, wherein a method for separation of $CO_2$ and $N_2$ in step 2 is as follows: the gas dried by the dryer enters the low-temperature LNG cooler via the inlet of the low-temperature LNG cooler, and the dry flue gas is reduced to about a boiling point temperature of $CO_2$ by LNG cold energy in the low-temperature LNG cooler; and the outlet of the low-temperature LNG cooler is connected to the inlet of the cryogenic adsorption device, $CO_2$ in the cryogenic dry flue gas is adsorbed and captured by the principle of cryogenic adsorption, crude carbon dioxide gas with high carbon purity is obtained in the desorbed gas outlet of the cryogenic adsorption device, and nitrogen-containing gas with high nitrogen purity and carbon dioxide content below 1 ppm is obtained in the discharged gas outlet of the cryogenic adsorption device, thereby obtaining purified raw gas containing carbon dioxide and nitrogen and achieving the purpose of carbon-nitrogen separation.

5. The method according to claim 2, wherein a method for purification and liquefaction of $N_2$ in step 3 is as follows: discharge gas from the discharged gas outlet of the cryogenic adsorption device is connected to the inlet of the raw material compressor via a pipeline to pressurize the nitrogen-containing gas; the outlet of the raw material compressor is connected to the first inlet of the cooler, the first outlet of the cooler is connected to the first inlet of the heat exchanger, the second inlet of the cooler is connected to the high-temperature cooling capacity NG inlet pipeline, and the second outlet of the cooler is connected to the NG discharge pipeline; the pressurized and cooled nitrogen-containing gas exchanges heat with external LNG, distilled circulating nitrogen, and distilled emptying gas in the heat exchanger, and is connected to the distillation system via the first outlet of the heat exchanger and separated and purified in the distillation system; the nitrogen outlet of the distillation system is connected to the second inlet of the heat exchanger, the nitrogen serves as circulating nitrogen and is connected to the inlet of the circulating compressor via the second outlet of the heat exchanger, the outlet of the circulating compressor is connected to the third inlet of the heat exchanger, the third outlet of the heat exchanger is connected to the gas-liquid separator, and a high-purity liquid nitrogen product is obtained at the bottom of the gas-liquid separator and flows out via the first outlet of the gas-liquid separator; the gas from the gas-liquid separator enters the sixth inlet of the heat exchanger via the second outlet of the gas-liquid separator, and enters the circulating compressor for compression via the second outlet after being reheated by the heat exchanger; the emptying gas from the distillation system is connected to the fourth inlet of the heat exchanger, and is discharged and emptied via the fourth outlet of the heat exchanger after being reheated; the LNG liquid inlet is connected to the fifth inlet of the heat exchanger, and the high-temperature cooling capacity NG flows out via the fifth outlet of the heat exchanger as a source of high-temperature cooling capacity for other systems; a method for purification and liquefaction of $CO_2$ in step 3 is as follows: desorbed gas from the cryogenic adsorption device is connected to the inlet of the $CO_2$ compressor via the desorbed gas outlet to pressurize the crude carbon dioxide gas; the outlet of the $CO_2$ compressor is connected to the first inlet of the cooler, the second inlet of the cooler is connected to the high-temperature cooling capacity NG inlet pipeline, the second outlet of the cooler is connected to the NG discharge pipeline, and the compressed crude carbon dioxide gas is cooled by the high-temperature cooling capacity NG in the cooler; the first outlet of the cooler is connected to the inlet of the evaporator, and the cooled crude carbon dioxide gas serves as a heat source of the evaporator to provide heat for the gasification of liquid carbon dioxide; the outlet of the evaporator is connected to the first inlet of the liquefier, the second inlet of the liquefier is connected to the high-temperature cooling capacity NG inlet pipeline, the second outlet of the liquefier is connected to the NG discharge pipeline, and the crude carbon dioxide is liquefied and condensed by the high-temperature cooling capacity NG in the liquefier; the first outlet of the liquefier is connected to the middle inlet of the purification tower, and the crude carbon dioxide entering the purification tower undergoes heat and mass transfer purification in the purification tower; the first inlet of the condenser at the top of the tower is connected to the high-temperature cooling capacity NG inlet pipeline, the first outlet of the condenser is connected to the NG outlet pipeline, rising gas at the top of the tower is condensed and refluxed by the high-temperature cooling capacity NG, some waste gas is discharged and emptied via the second outlet of the purification tower, and industrial grade liquid carbon dioxide is obtained at the bottom of the purification tower and connected to the storage system via the first outlet at the bottom of the purification tower as an industrial grade liquid carbon dioxide product, or connected to the carbon dioxide refining system for secondary purification of $CO_2$ to obtain food grade carbon dioxide.

6. The method according to claim 5, wherein the cold source for the cooler, the liquefier, the condenser, and the cooler in the $N_2$ purification and liquefaction system comes from the high-temperature cooling capacity NG generated during LNG vaporization, which is lower in energy consumption, safe and environment-friendly and can also achieve the recovery and utilization of the high-temperature cooling capacity LNG compared to conventional cold production by an electrically driven refrigeration mechanism.

7. The method according to claim 6, wherein the $N_2$ purification and liquefaction system uses the cold energy released during LNG gasification in the heat exchanger to drive the production of the liquid nitrogen product, instead of conventional cold production comprising compression and expansion with electrical energy, thereby greatly reducing energy consumption for the production of the high-purity liquid nitrogen product; meanwhile, the high-temperature cooling capacity NG generated during the gasification of LNG in the $N_2$ purification and liquefaction system to release energy can be used as a cold source for other components of the recovery system, thereby achieving gradient utilization of the cold energy of LNG at different temperatures.

* * * * *